E. A. JEFFERY.
Griddle.

No. 197,516.  Patented Nov. 27, 1877.

ATTEST=
Henry A. Burkes
Chas. M. Higgins

INVENTOR=
Edwin A. Jeffery
Per Burke & Fraser
Attys.

UNITED STATES PATENT OFFICE.

EDWIN A. JEFFERY, OF JERSEY CITY, NEW JERSEY.

IMPROVEMENT IN GRIDDLES.

Specification forming part of Letters Patent No. 197,516, dated November 27, 1877; application filed May 5, 1877.

*To all whom it may concern:*

Be it known that I, EDWIN A. JEFFERY, of Jersey City, in the county of Hudson and State of New Jersey, have invented certain Improvements in Griddles, of which the following is a specification:

This invention consists, essentially, in a mold-ring plate hinged to the griddle, or otherwise connected therewith, so as to be reversible in position thereon, and capable of being turned over from side to side of the same, leaving the cakes that have been molded and formed thereby to bake, while the mold is ready to receive a new charge of batter.

It also consists in providing the hot-air chamber beneath the griddle with regulating dampers or ventilators, whereby the temperature of the same may be varied at will.

It also consists in the peculiar construction of molds or rings and the operating or lifting handle, all of which will be fully hereinafter described.

Figure 1:
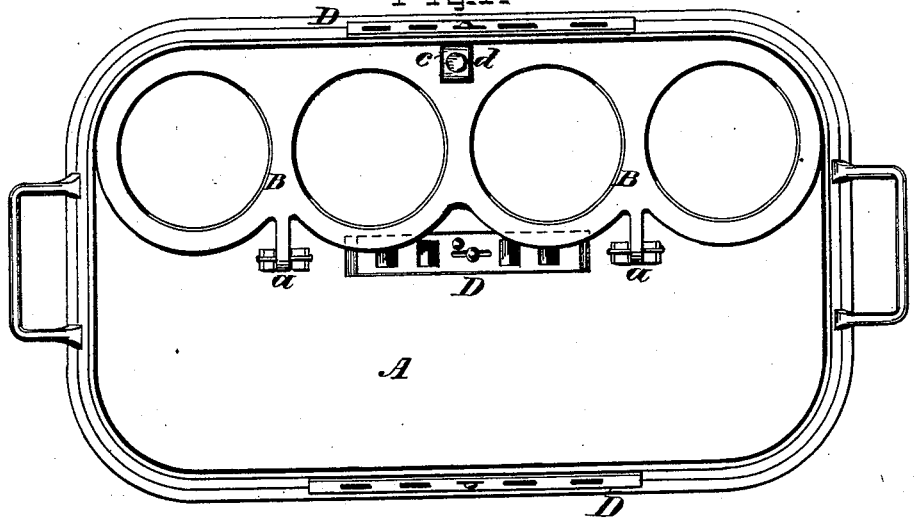
Figure 2:
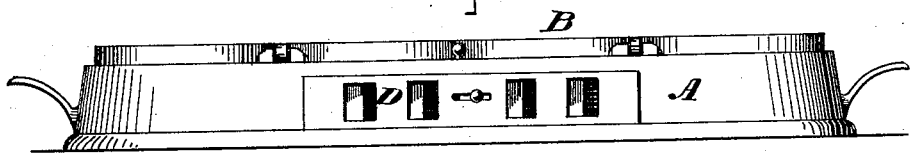
Figure 4:
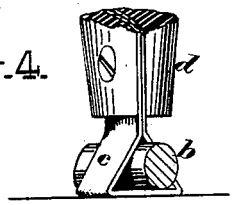
Figure 3:
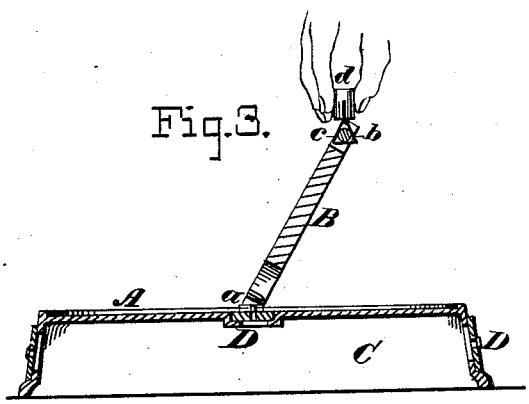
Figure 5:
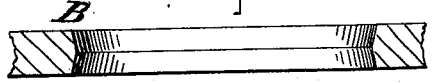

In the drawings, Figure 1 is a plan of a griddle embodying my improvements. Fig. 2 is a side elevation of the same. Fig. 3 is a transverse mid-section of the same. Fig. 4 is an enlarged detail view, showing the construction of the lifting-handle. Fig. 5 is an enlarged sectional detail, showing the manner of beveling the mold-rings.

Let A represent the griddle, and B a mold-ring plate, hinged thereto at $a$ $a$ in any good and convenient manner. This plate is made about twice the thickness of an ordinary griddle-cake, and the walls of the molds or mold-rings are slightly beveled to the center, as shown in the detail, Fig. 5, so as to permit the mold to lift freely from the cake, whichever side of the plate B may be up.

When the griddle is hot enough, and the molds have been properly greased, the batter is poured into them until they are about half full. After the cakes have become "set," or seared by the heat, the cook takes hold of the handle of the mold-plate, somewhat as shown in Fig. 3, and turns the plate over on the griddle, leaving the cakes to be turned and removed by ordinary means when baked sufficiently. As soon as the plate is turned over so as to rest upon the other side of the griddle, the molds may again be charged with batter, as before. When the first cakes are done and removed out of the way, the plate may be turned back to that side, thus keeping up the operation indefinitely.

Beneath the griddle is shown a hot-air chamber, C, and in the wall or walls of this chamber are fitted one or more dampers or ventilators, D. These may be constructed in the manner shown, or in any known equivalent manner. As shown, openings in the wall of the air-chamber are arranged to match corresponding holes in a slide. A screw or rivet working through a slot in the slide regulates the play of the same. The ventilator or damper may be fixed in one, two, or all of the walls of the chamber, or in the top, or both, as shown. The object of the ventilator is to so regulate the heat of the griddle that it need not be moved about from one part of the stove to another—from a hot part to a cool part, and vice versa.

The ring-plate B is provided with a peculiarly-constructed handle, which I will now describe: A bar, $b$, (see Fig. 4,) is cast or formed in the plate, or attached thereto, to receive the loop $c$ of a wooden or other non-conducting handle, $d$. The peculiarity consists in giving the loop $c$ a nearly or quite equilaterally-triangular form, as shown. I prefer to construct said loop out of sheet metal, put it around the bar $b$, place the ends in a saw-kerf in the handle $d$, and fasten by putting a screw or rivet through all.

The object of this construction is that the handle may remain vertical. The lower side of the triangular loop, resting on the griddle, prevents its being turned over, the weight of the ring-plate serving to keep it erect and ready to grasp without burning the fingers.

The plate B may contain one or more molds, and the griddle should be about twice as broad as the mold-plate.

I claim—

1. A griddle, as an article of manufacture, provided with a mold-ring plate, B, hinged about the center of the same, and provided with one or more molds or openings extending through the said plate, all substantially as herein described and shown.

2. The combination of a bar, b, triangular loop c, and handle d, of wood or other suitable material, to form a handle, substantially as and for the purpose set forth.

3. The mold or opening in the plate B, having its wall beveled or flared from the center out to each side, as shown in Fig. 5, and as herein set forth.

In witness whereof I have hereunto signed my name in the presence of two subscribing witnesses.

EDWIN A. JEFFERY.

Witnesses:
SAM. TEO. SMITH,
HENRY CONNETT.